United States Patent
Rajput et al.

(10) Patent No.: US 8,954,466 B2
(45) Date of Patent: *Feb. 10, 2015

(54) USE OF STATISTICAL LANGUAGE MODELING FOR GENERATING EXPLORATORY SEARCH RESULTS

(75) Inventors: Nitendra Rajput, New Delhi (IN); Shrey Sahay, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 217 days.

This patent is subject to a terminal disclaimer.

(21) Appl. No.: 13/599,303

(22) Filed: Aug. 30, 2012

(65) Prior Publication Data

US 2013/0226913 A1  Aug. 29, 2013

Related U.S. Application Data

(63) Continuation of application No. 13/408,687, filed on Feb. 29, 2012.

(51) Int. Cl.
  *G06F 7/00* (2006.01)
  *G06F 17/30* (2006.01)

(52) U.S. Cl.
  USPC .......................................... 707/767

(58) Field of Classification Search
  USPC .............................. 707/723, 732, 728, 765–67
  See application file for complete search history.

(56) References Cited

U.S. PATENT DOCUMENTS

| | | | | |
|---|---|---|---|---|
| 5,920,826 A * | 7/1999 | Metso et al. | | 455/557 |
| 6,832,218 B1 * | 12/2004 | Emens et al. | | 1/1 |
| 7,590,603 B2 * | 9/2009 | Zhang et al. | | 706/12 |
| 7,698,333 B2 * | 4/2010 | Cipollone | | 707/731 |
| 7,747,639 B2 * | 6/2010 | Kasperski et al. | | 707/765 |
| 7,756,855 B2 * | 7/2010 | Ismalon | | 707/713 |
| 7,818,315 B2 * | 10/2010 | Cucerzan et al. | | 707/723 |
| 8,255,414 B2 * | 8/2012 | Lee et al. | | 707/767 |
| 8,266,162 B2 * | 9/2012 | Cava | | 707/755 |
| 2005/0203878 A1 * | 9/2005 | Brill et al. | | 707/3 |
| 2005/0289140 A1 * | 12/2005 | Ford et al. | | 707/5 |
| 2006/0004711 A1 * | 1/2006 | Naam | | 707/3 |
| 2006/0161520 A1 * | 7/2006 | Brewer et al. | | 707/3 |
| 2006/0184464 A1 * | 8/2006 | Tseng et al. | | 706/14 |
| 2006/0206460 A1 * | 9/2006 | Gadkari | | 707/3 |
| 2007/0260597 A1 * | 11/2007 | Cramer | | 707/5 |
| 2008/0028036 A1 * | 1/2008 | Slawson et al. | | 709/217 |
| 2008/0319975 A1 * | 12/2008 | Morris et al. | | 707/5 |
| 2009/0024598 A1 * | 1/2009 | Xie et al. | | 707/4 |
| 2009/0037401 A1 * | 2/2009 | Li et al. | | 707/5 |
| 2009/0077037 A1 * | 3/2009 | Wu et al. | | 707/3 |
| 2009/0248666 A1 * | 10/2009 | Ahluwalia | | 707/5 |
| 2010/0169316 A1 * | 7/2010 | Gehlot et al. | | 707/736 |
| 2012/0226687 A1 * | 9/2012 | Xu et al. | | 707/728 |
| 2012/0259829 A1 * | 10/2012 | Zhou | | 707/706 |

* cited by examiner

*Primary Examiner* — Jeffrey A Burke

(74) *Attorney, Agent, or Firm* — Ference & Associates LLC

(57) ABSTRACT

Methods and arrangements for generating exploratory search results. A first search query is accepted in a browsing session, and first search result set is derived, comprising at least one search result from the first search query. A second search query is predicted, and a second search result set is derived, comprising at least one search result from the second search query. A final search result set is yielded via combining the first search result set and the second search result set.

10 Claims, 4 Drawing Sheets

US 8,954,466 B2

USE OF STATISTICAL LANGUAGE MODELING FOR GENERATING EXPLORATORY SEARCH RESULTS

CROSS REFERENCE TO RELATED APPLICATION

This application is a continuation of U.S. patent application Ser. No. 13/408,687, entitled USE OF STATISTICAL LANGUAGE MODELING FOR GENERATING EXPLORATORY SEARCH RESULTS, filed on Feb. 29, 2012, which is incorporated by reference in its entirety.

BACKGROUND

When a user conducts an internet search, it is usually the case that the search results displayed for a given search query are not related to other queries issued by a user in a given browsing session. Apart from the query, the search results, conventionally, have been related to user similarity, collaborative filtering, tag similarity, and semantic similarity. While search results might be fine-tuned and improved in this manner, a wealth of data and information potentially to be found in a contextual correlation between different queries in a particular user session remains unused.

BRIEF SUMMARY

In summary, one aspect of the invention provides a method comprising: accepting a first search query in a browsing session; deriving a first search result set comprising at least one search result from the first search query; predicting a second search query; deriving a second search result set comprising at least one search result from the second search query; and yielding a final search result set via combining the first search result set and the second search result set.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
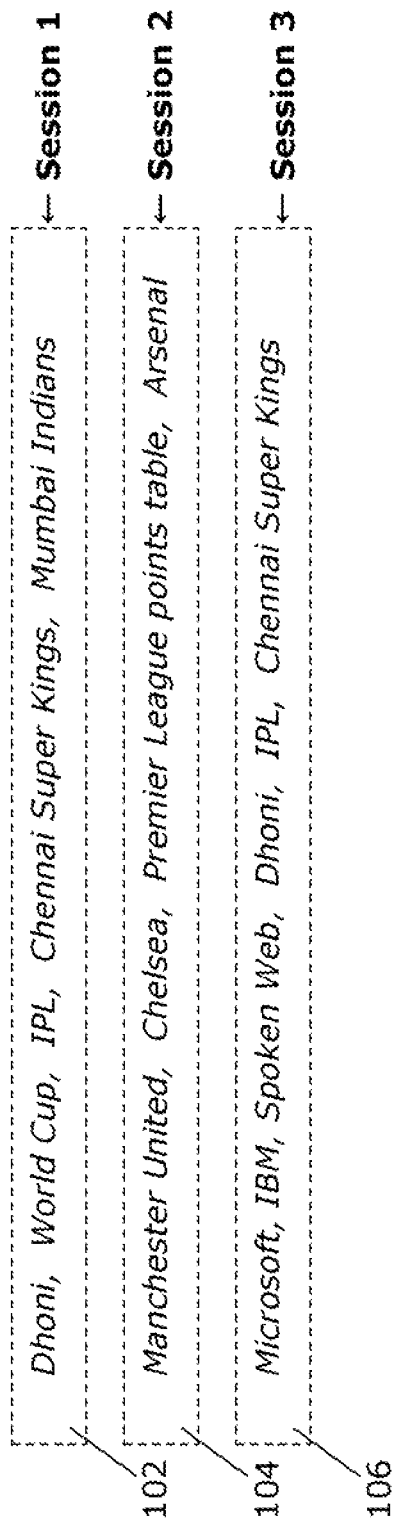
FIG. 1 schematically illustrates sample strings of queries submitted by at least one given user in a particular browsing session.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
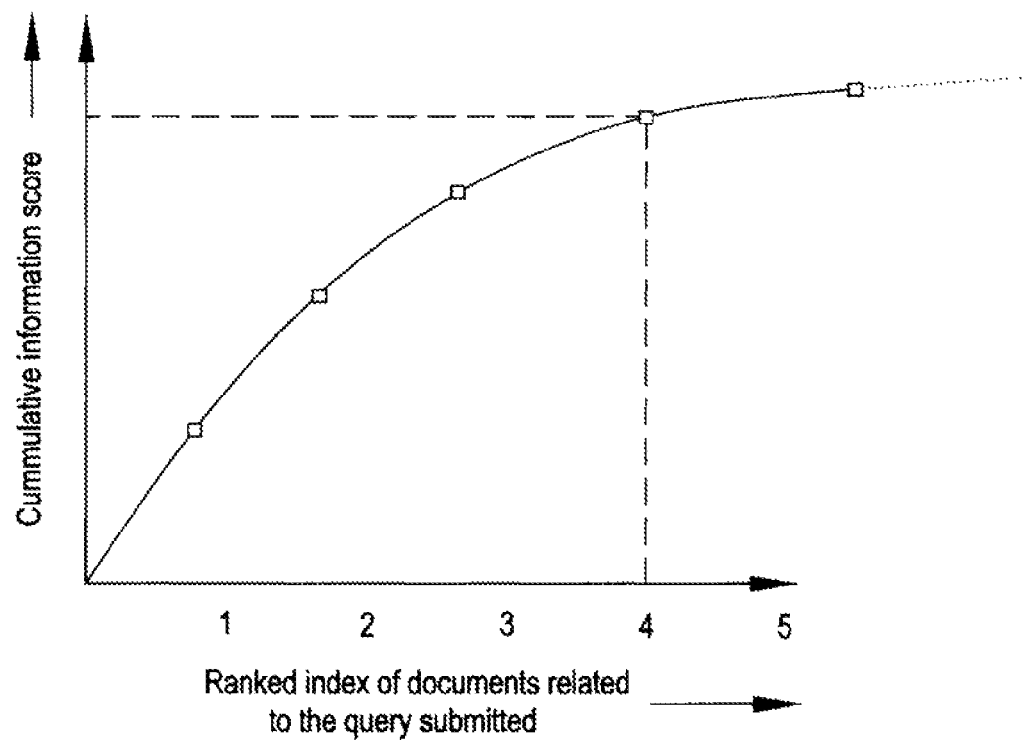
FIG. 2 sets forth a graph which plots a cumulative information score against a ranked index of documents related to a query submitted.

The disclosure now turns to FIGS. 1 and 2. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1 and 2 can be performed or utilized by way of a processing unit or units and system memory such as those indicated, respectively, at 16' and 28' in FIG. 4, whether on a server computer, a client computer, a node computer in a distributed network, or any combination thereof.

In accordance with at least one embodiment of the invention, there is broadly contemplated herein the creation of a statistical language model of strings of search query terms in a particular user browsing session, whereupon this language model is used to derive additional query words and append new relevant results to the existing search results. The method can also be used for recommending other relevant queries FIG. 1 illustrates, in accordance with at least one embodiment of the invention, sample strings of queries submitted by at least one given user in a particular browsing session, from which a statistical language model can be derived. In a first session 102, the queries are as follows: "Dhoni, World Cup, IPL, Chennai Super Kings, Mumbai Indians". In a second session 104, the queries are thus: "Manchester United, Chelsea, Premier League points table, Arsenal". Finally, in a third session 106 in the present example, the queries are thus: "Microsoft, IBM, Spoken Web, Dhoni, IPL, Chennai Super Kings". Different ones of the sessions 102/104/106 can be conducted by the same user or different users.

In accordance with at least one embodiment of the invention, with relation to the present illustrative example, bigrams and trigrams can now be ascertained via a suitable natural language processing model, with corresponding confidence scores assigned to them, as follows:

World Cup|Dhoni=0.923
IPL|Dhoni=0.810
Chelsea|Manchester United, Premier League points table=0.537
Chelsea|Manchester United=0.824
etc. . . .

(Any of a very wide variety of suitable natural language processing models can be used for this purpose. One illustrative and non-restrictive example is the n-gram statistical language model as disclosed in Peter F. Brown, Peter V. deSouza, Robert L. Mercer, Vincent J. Della Pietra, and Jenifer C. Lai, "Class-based n-gram models of natural language", December 1992, Association for Computational Linguistics, Volume 18, Number 4, pages 467-479).

In accordance with at least one embodiment of the invention, if a query is now submitted by the user, results of a related entity are displayed in consideration of a high confidence score connected to a related bigram or trigram. (While bigrams and trigrams are discussed here, it should be understood that n-grams of more than three words, i.e., n>3, can be considered and employed here.) In accordance with the present illustrative example, if the user's newly submitted query is "Manchester United", then search results relating to "Chelsea" should be displayed along with the top x results of an initial search query of "Manchester United", with x to be defined more fully herebelow. Particularly, since the bigram value of "Manchester United Chelsea" is very high, an implication can be divined that users often search "Chelsea" after "Manchester United".

In accordance with at least one embodiment of the invention, FIG. 2 sets forth a graph which plots a cumulative information score against a ranked index of documents related to a query submitted. (Any of a very wide variety of suitable arrangements for deriving information scores can be used for this purpose. One illustrative and non-restrictive example is disclosed in Advances in Information Retrieval Theory (Proceedings of the 2nd International Conference on the Theory of Information Retrieval, ICTIR 2009, Sep. 10-12, 2009, LCNC 5766), Azzopardi, L.; Kazai, G.; Robertson, S.; Rüger, S.; Shokouhi, M.; Song, D.; Yilmaz, E. [Eds.]. In other words, "index 1" can be considered to be the first document or page that is returned in a search, "index 2" is the second, "index 3" is the third and so on. As shown in FIG. 2, the cumulative information score starts decreasing after index 4 rapidly, as does the derivative of the curve. So, in this case, one can start inserting other relevant results after displaying the top 4 search results. The threshold helps in ensuring against an excessive loss of information. While conceivably there are a variety of manners for determining the threshold, one advantageous manner involves assigning the threshold based on empirical data or observations, after performing a few experiments with users. The threshold can thus be selected such that a comparatively lower threshold will result in the presentation of more exploratory results, while a comparatively higher threshold will result in the presentation of only a few exploratory results.

In accordance with at least one embodiment of the invention, by way of appending other relevant results to original results, and in accordance with the present illustrative example, suppose that the ranked results of links related to the Manchester United query are marked as follows:

Manchester United-1(Information score: $x1$)
Manchester United-2(Information score: $x2$)
Manchester United-3(Information score: $x3$)
Manchester United-4(Information score: $x4$)
etc. . . .
where $x1>x2>x3>x4>$ . . .

In this respect, "Manchester United-1" could be a webpage highly relevant to and/or directly associated with the Manchester United football club, e.g., the official homepage of the club. Similarly, in accordance with the present illustrative example, the top results would be Chelsea-1, Chelsea-2, etc., while for Arsenal they would be Arsenal-1, Arsenal-2, etc. and for Liverpool they would be Liverpool-1, Liverpool-2, etc. and so on . . . .

In accordance with at least one embodiment of the invention, illustrated by way of the present non-restrictive example, if the search query "Manchester United" is entered, the results are displayed in a manner now to be described, and with continued reference to FIG. 2. First, the top four results of Manchester United are shown, because, as can be seen from the graph of FIG. 2, the first derivative appears as less than the minimum threshold, and hence results after index 4 can be understood as being of not much significance. Next, let it be assumed that posterior probabilities (i.e., confidence scores derived from the created language model are as follows, along with their information scores:

P(Chelsea|Manchester United)=0.80
P(Arsenal|Manchester United)=0.70
P(Liverpool|Manchester United)=0.60
I_score(Chelsea-1)=0.5
I_score(Arsenal-1)=0.9
I_score(Liverpool-1)=0.9
(where I_score is the information score)

Thus,

P(Chelsea|Manchester United)*I_score(Chelsea-1)<
P (Liverpool|Manchester United)*I_score(Liverpool-1)<
P(Arsenal|Manchester United)*I_score (Arsenal-1)

Accordingly, in the context of the present illustrative example in accordance with at least one embodiment of the invention, Arsenal-1 should be displayed prior to Liverpool-1, which itself should be displayed prior to Chelsea-1. In other words, the higher the cumulative information score, the earlier it should be displayed in the search results.

In accordance with at least one embodiment of the invention, search results can be presented to users in different manners. The results for a predicted search query can be separately presented to a user by explicitly referring to them as recommendations. The recommendations can be presented to the user either after the results of a first search query, or the user can be explicitly asked whether he/she is interested in the results of the query or in the recommendations. If the user selects recommendations, then the results of a predicted second search query are presented to the user. If the user selects query results, then only the results of the first search query are presented.

Figure 3:
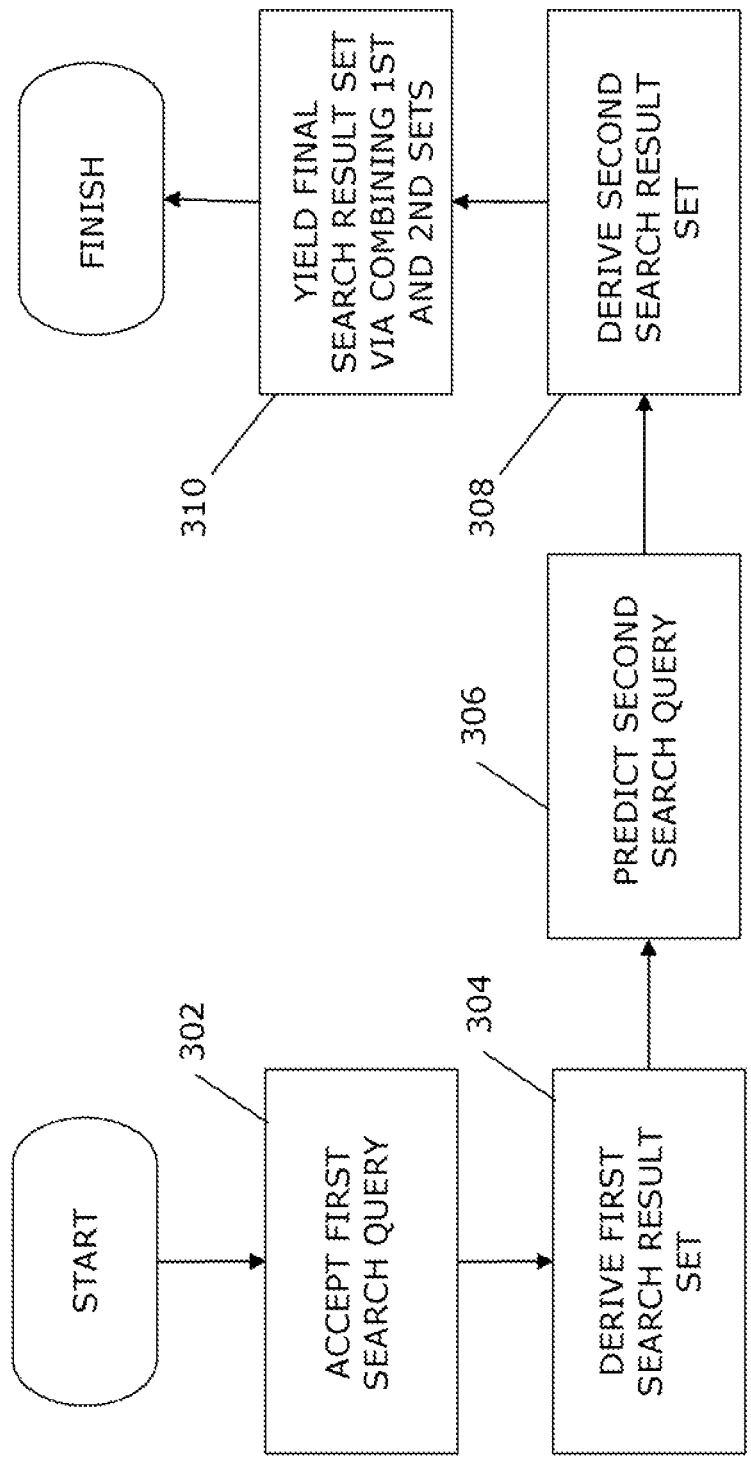
FIG. 3 sets forth a process more generally for generating exploratory search results.

FIG. 3 sets forth a process more generally for generating exploratory search results, in accordance with at least one embodiment of the invention. It should be appreciated that a process such as that broadly illustrated in FIG. 3 can be carried out on essentially any suitable computer system or set of computer systems, which may, by way of an illustrative and on-restrictive example, include a system such as that indicated at 12' in FIG. 4. In accordance with an example embodiment, most if not all of the process steps discussed with respect to FIG. 3 can be performed by way a processing unit or units and system memory such as those indicated, respectively, at 16' and 28' in FIG. 4.

As shown in FIG. 3, a first search query is accepted in a browsing session (302), and first search result set is derived, comprising at least one search result from the first search query (304). A second search query is predicted (306), and a second search result set is derived, comprising at least one search result from the second search query (308). A final search result set is yielded via combining the first search result set and the second search result set (310).

Figure 4:
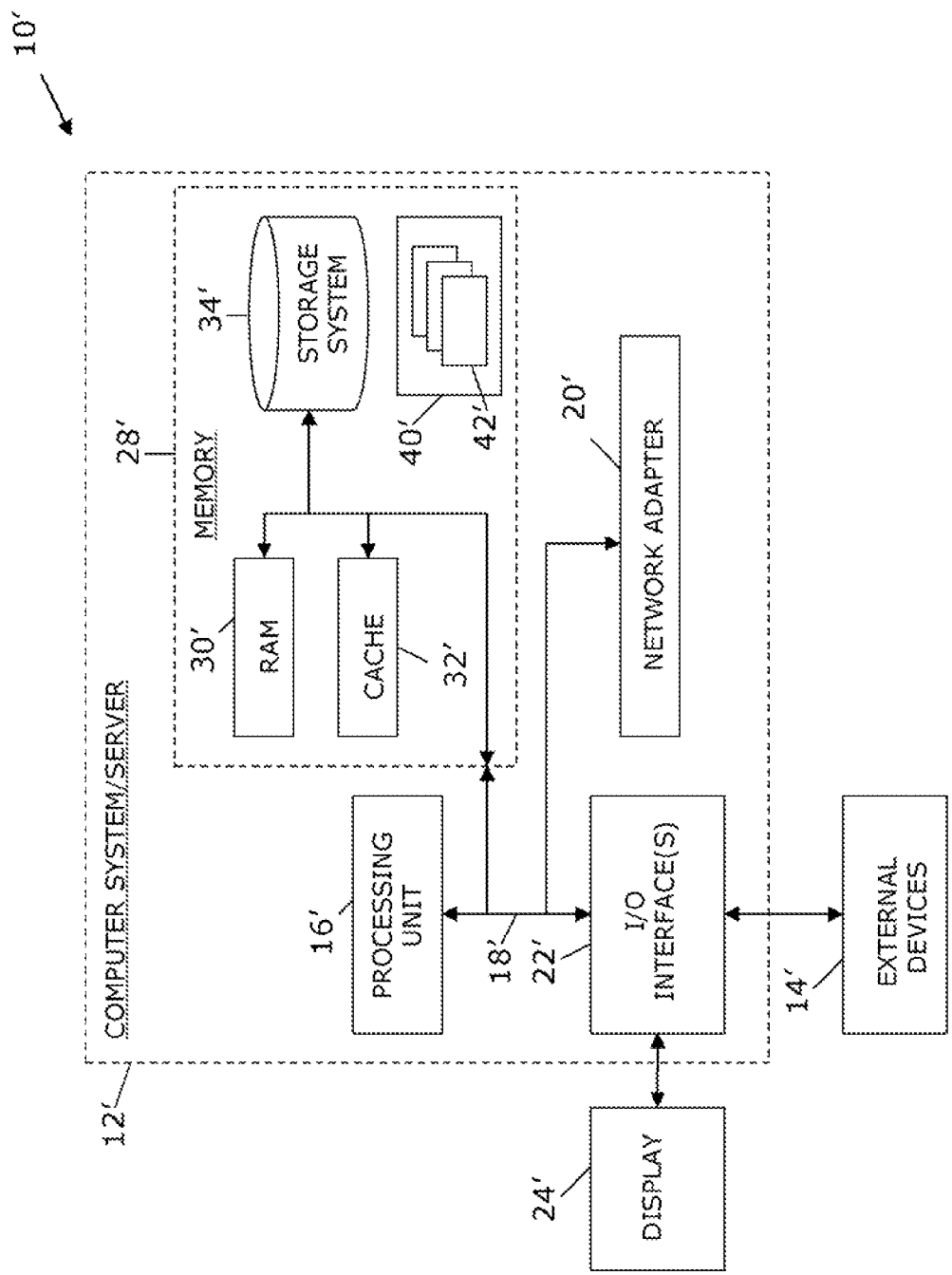
FIG. 4 illustrates a computer system.

Referring now to FIG. 4, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating system, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enable a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
utilizing at least one processor to execute computer code configured to perform the steps of:
accepting a first search query in a browsing session;
deriving a first search result set comprising at least one search result from the first search query;
predicting a second search query;
deriving a second search result set comprising at least one search result from the second search query;
yielding a final search result set via combining the first search result set and the second search result set;
wherein said deriving of a first search result set comprises ascertaining a quantity k of at least one search result first occurring responsive to the first accepted search query;
wherein said ascertaining comprises determining k based on a comparison of a first derivative of a cumulative confidence score of retrieved ranked documents to a predetermined threshold; the first derivative being determined as a function of the cumulative confidence score compared to a number of retrieved ranked documents; and
wherein the retrieved ranked documents comprise documents retrieved from the first search result set and ranked on a basis of confidence scores from compared N-grams from within the documents comprising at least one of: compared bigrams, and compared trigrams.

2. The method according to claim 1, wherein said yielding comprises appending the second search result set to the first search result set.

3. The method according to claim 1, wherein said predicting comprises consulting historical search queries from previous browsing sessions.

4. The method according to claim 3, wherein said predicting further comprises determining n-grams of search queries from previous browsing sessions.

5. The method according to claim 4, wherein said determining comprises determining n-grams of the first search query with respect to other search queries from previous browsing sessions.

6. The method according to claim 4, wherein the n-grams comprise at least one taken from the group consisting of: bigrams, trigrams.

7. The method according to claim 4, further comprising assigning confidence scores to the n-grams.

8. The method according to claim 7, wherein said predicting comprises comparing confidence scores and ascertaining the second search query based on a highest confidence score.

9. The method according to claim 1, wherein said yielding comprises:
   assigning at least one rank to the quantity k of at least one search result;
   assigning at least one rank to the at least one search result in the second search result set; and
   ranking the at least one search result from the second search result set after the quantity k of at least one search result from the first search result set.

10. The method according to claim 1, further comprising presenting the second search result set via presenting a recommendation.

* * * * *